Aug. 15, 1933. T. G. MOULDING ET AL 1,922,316
AIR CLEANER
Filed July 9, 1930 3 Sheets-Sheet 1
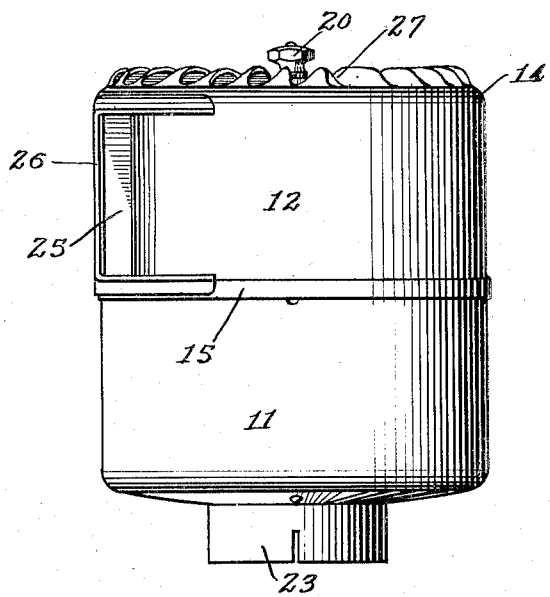
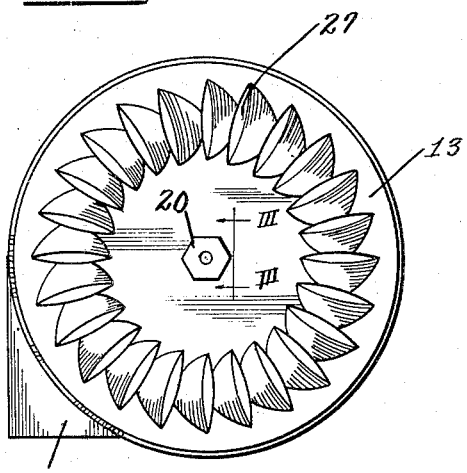
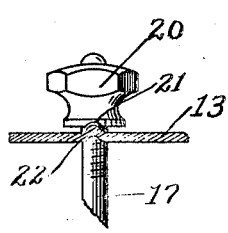
Inventors
Thomas G. Moulding,
John T. Beatty.
By Charles M. Hill Attys.

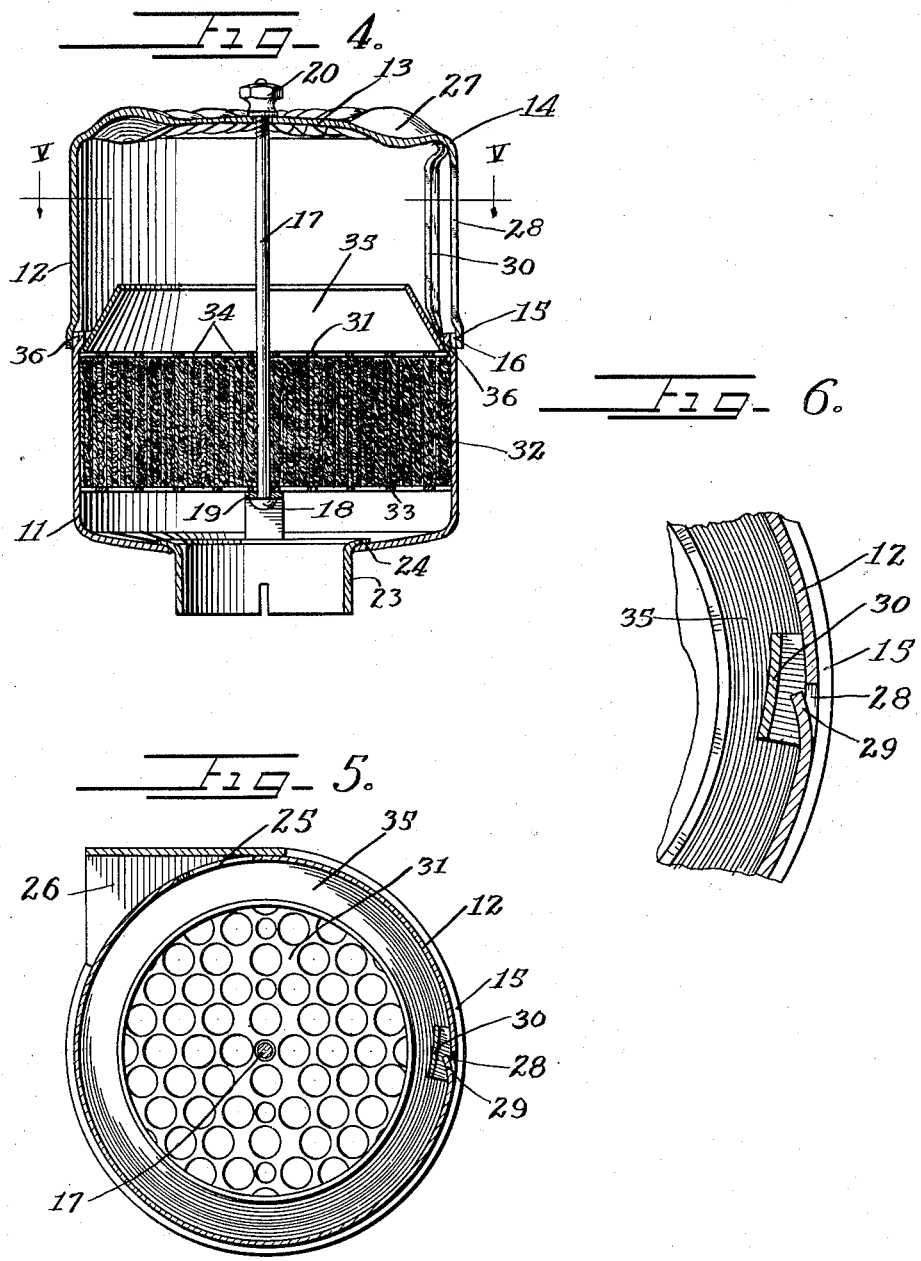

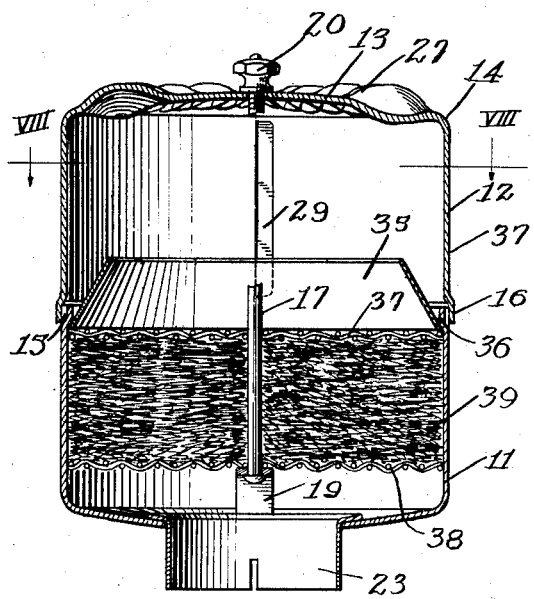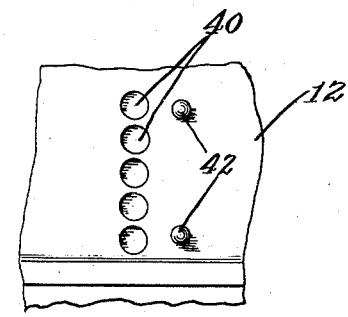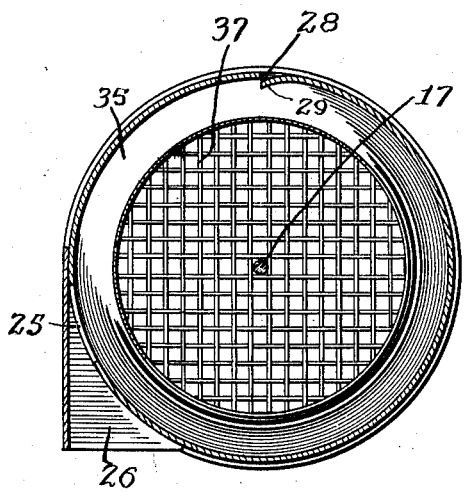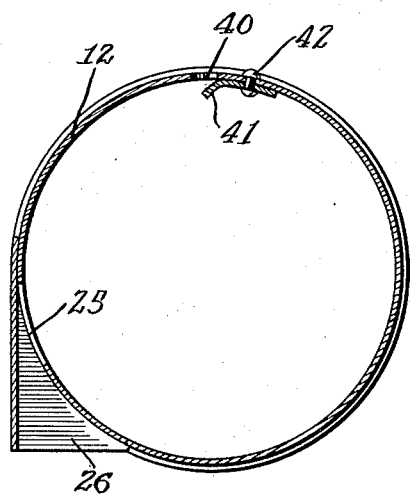

Patented Aug. 15, 1933

1,922,316

UNITED STATES PATENT OFFICE 1,922,316

AIR CLEANER

Thomas G. Moulding and John T. Beatty, Chicago, Ill., assignors, by mesne assignments, to Ross J. Beatty, Highland Park, Ill.

Application July 9, 1930. Serial No. 466,635

4 Claims. (Cl. 183—48)

This invention relates to improvements in air cleaners for removing dust, dirt particles, foreign substances, and the like from air or other gases, the invention being highly desirable for use in connection with the air intake for various types of internal combustion engines including automotive engines, Diesel engines, etc., and air compressors and similar apparatus, although the invention has many and various uses as will be apparent to one skilled in the art.

In the past, a great number of many kinds and characters of air cleaners have been devised for use in connection with mechanical apparatus, but have, in most instances, proven objectionable in that they were not desirably efficient and required an objectionable amount of attention. For maximum efficiency, centrifugal type air cleaners have not produced desirable results, and while some filter type air cleaners have proven highly efficient, yet it was necessary to replace the filter material or cleanse that already in the cleaner so frequently as to render the cleaner objectionable due to the upkeep thereof. In many other instances, for operation at highest efficiency, air cleaners had to be disposed in a particular position, and a change of position, for example from horizontal to vertical, was attended with a corresponding reduction in efficiency.

The present invention has been designed to overcome the above noted as well as many defects and objections in the provision of an air cleaner disposable in any desired position, and which is so nearly one hundred percent efficient that the difference is negligible.

The invention also seeks the provision of a combined centrifugal and filter air cleaner wherein the whirling and filtering actions are maintained separate and individual with the result that the filter means need only be cleaned at relatively great intervals.

It is also an object of this invention to provide an air cleaner having a centrifugal action and so arranged that there will be a backward suction adjacent the discharge opening for foreign particles, this backward suction removing lighter foreign particles that tend to remain in the whirling air and whirl therewith unless given an additional urge towards the outer part of the whirling mass.

A further object of this invention is the provision of a combination centrifugal and filter type air cleaner, wherein means are provided for preventing the heavier dirt particles and other matter removed from the air by a whirling action from contacting with the filtering element.

A still further object of this invention is the provision of an air cleaner including a two-part casing having filtering means therein, which casing may be very easily taken apart and put together by unitary securing means automatically adapted for the prevention of unintentional release thereof.

It is still another object of this invention to provide an air cleaner having a mass of filtering material therein, which material is wound upon a spool prior to insertion into the air cleaner casing, this being a very expeditious and simple step in the assembly of the cleaner.

Still a further object of this invention is the provision of an air cleaner in which foreign particles are removed from the air by a whirling action, which cleaner has a plurality of inlets arranged to impart a whirling action to incoming air, the inlets being disposed in different transverse planes.

While some of the more salient features, characteristics and advantages of a device embodying the present invention have been above pointed out, others will become apparent from the following disclosures.

The invention includes these and other features of construction and combinations of parts hereinafter described, and shown in a preferred form in the drawings, as more particularly indicated by the claims.

On the drawings:

Figure 1 is an elevational view of an air cleaner embodying principles of the present invention.

Figure 2 is a top plan view of the structure shown in Figure 1.

Figure 3 is an enlarged fragmentary vertical sectional view taken substantially as indicated by the line III—III of Figure 2.

Figure 4 is a central vertical sectional view, with parts shown in elevation, of the structure shown in Figure 1.

Figure 5 is a plan sectional view taken substantially as indicated by the line V—V of Figure 4.

Figure 6 is an enlarged fragmentary plan sectional view of the right hand portion of the device as the same is viewed in Figures 4 and 5.

Figure 7 is a vertical sectional view similar to Figure 4, with parts in elevation and parts broken away, of a slightly different form of the invention.

Figure 8 is a plan sectional view taken substantially as indicated by the line VIII—VIII of Figure 7.

Figure 9 is an enlarged fragmentary view in elevation of a still different form of this invention.

Figure 10 is a plan sectional view of a cleaner incorporating the structure shown in Figure 9.

As shown on the drawings:

In the illustrated embodiment of this invention, there is shown a device for cleaning air and other gases, which device includes a casing formed of two parts, a lower part 11 and an upper part 12, the upper part 12 having an end wall 13 which merges into the side wall of the casing along a distinct curvature 14 to preclude sharp internal angles in which dust and dirt may accumulate. The two casing parts telescopically fit together, the upper part 12 being provided with an outwardly extending annular bead to form a flange 15 adjacent the lower end thereof, and the lower casing part 11 being provided with an inward bead to form a flange 16 complemental to the flange 15 to establish a telescopical fit as best seen in Figure 4. Each of the casing parts 11 and 12 is preferably a one-piece cylindrical sheet metal stamping, but, of course, the parts may be made in any desirable manner and in any desired shape, a cylindrical casing functioning better in that it affords no obstruction to whirling air.

The two casing parts 11 and 12 are detachably held together by means of a through bolt 17 having a rivet head 18 on one end thereof engaged on the under side of a yoke 19 secured in any desired manner as by brazing or welding to the lower portion of the casing part 11, this bolt being threaded at the opposite or upper end thereof to accommodate a thumb nut 20 which bears against the end wall 13 of the part 12. With reference now to Figure 3, it will be seen that the thumb nut 20 is provided on each side thereof with a radially extending groove 21, the grooves being diametrically opposed, and the part 12 of the casing is upwardly beaded as at 22 complementally to the grooves in the thumb nut. Therefore, when the thumb nut is tightened to a reasonable degree, the end wall 13 will spring downwardly due to its inherent resiliency until the grooves 21 coincide with the beads 22 when the end wall will move outwardly, the beads entering the grooves 21 to lock the thumb nut against unintentional loosening or removal.

At this point, it might be well to mention herein that although the casing is shown as vertically disposed, and although the parts thereof are referred to as upper and lower parts, it is to be distinctly understood that the casing may be disposed in any desirable position, the device functioning in vertical, horizontal, oblique, and even in an inverted position.

The lower part 11 of the casing is provided with a relatively large axial opening therein through which a clean air outlet conduit 23 extends, the conduit being flanged as at 24 on its inner end and riveted, welded, or otherwise secured to the part 11 adjacent the axial opening therein. This conduit 23 may be provided with any suitable attachment means for connecting the same to the intake of an automotive engine, air compressor, or other mechanical apparatus, and in most instances wherein the present invention will be used, the engine will create a suction which will act, as far as the cleaner is concerned, in the conduit 23, thereby causing impure air to enter the cleaner, pass therethrough, and exit through the conduit 23 into the engine.

The upper part 12 of the casing is provided, in this instance, with a relatively long slot or opening 25 for incoming dirty air, this opening being shielded by a tangentially disposed hood 26, whereby incoming air will enter the casing tangentially thereto and whirl around in the part 12, the greatest whirl being adjacent the casing wall. This part 12 of the casing is substantially empty so that there will be nothing to interfere with the free whirling motion of the air. The end wall 13 of the part 12 is provided with an annular series of louver-like inlet openings also for the purpose of allowing air to enter the casing and for imparting a whirling action to this air upon its entrance. The louver-like inlets 27 are preferably formed by slitting the casing and then radially spreading the margins adjacent the slits to form passages extending obliquely inwardly which will cause the air to whirl upon entering the same. While the major portion of incoming air will probably enter through the opening 25, the annular series of inlets 27 will also admit some air with a definite whirling action, and due to this fact, the major portion of the air whirling within the part 12 will be held adjacent the end wall 13, and heavier foreign substances separated from the air by the whirling action are thereby prevented from contacting filtering means to be later described herein, prior to the discharge of these heavier particles through an outlet therefor now about to be described.

Spaced from the inlet 25, preferably about one-fourth the circumference of the casing, is an outlet opening 28 in the form of a long slot extending substantially the length of the part 12. In providing this outlet for foreign substances separated from the air by the whirling motion, the casing is slit and then one margin 29 thereof bent inwardly to act as a skimmer for those foreign particles which have not quite reached the casing wall. Adjacent the discharge opening 28 but spaced inwardly therefrom is a curved strip 30 of a length greater than the opening 28 and extending parallel with the long axis thereof. This strip 30, as seen more clearly in Figures 4 and 6, is outwardly bent at the end portions thereof beyond the corresponding edges of the opening 28, and these bent portions are secured to the casing in any desired manner as by brazing or welding. With reference now to Figure 6, it will be noted that the strip 30 is slightly arcuate along a greater radius than the casing, and the said strip is disposed at an angle to the outlet opening 28 so that the strip and casing wall diverge in the direction of whirl. Due to the positioning of this strip, and the speed with which whirling air will be discharged through the opening 28, there will be a rearward suction created adjacent the far end of the strip 30 in the direction of the whirl, whereby foreign particles not quite sufficiently heavy to be discharged through the opening 28, but which, on the other hand, will be carried by the whirling air along the inner side of the strip 30 will be caught by the said rearward suction and drawn backwardly opposite to the direction of whirl between the strip and the casing wall and thus caused to exist through the opening 28, whereby a more thorough cleaning action is provided than is common to centrifugal cleaners heretofore known.

The foregoing action of separating foreign particles from air by centrifugal force occurs within the part 12 of the casing, and after most of the foreign particles carried by the air have been thus separated and expelled from the casing through the opening 28, air is drawn downwardly mostly from the central portion of the whirling air by suction in the outlet conduit 23. This downwardly drawn air must first pass through a perforate plate 31, then through a mass of filter material 32 of substantially the same diameter as the casing, then through another perforate plate 33 before the air reaches the outlet conduit 23. During its passage through the filtering material, practically all of the remaining foreign substances, those not removed by the whirling action, are removed from the air so that the same will be substantially entirely pure when it leaves the casing through the outlet conduit 23.

In the present instance, the mass of filtering material 32, which may be steel wool, aluminum shavings, or any suitable fibrous material, metallic or otherwise, may be initially wound upon the through bolt 17 as a spool between the perforate plates 31 and 33 which are secured in position upon the bolt 17 in any desired manner. After the winding of the filtering mass upon its spool, the mass is dipped in a light oil, and thereafter inserted in the casing.

To prevent heavier foreign particles carried by incoming air from contacting with the filter mass 32, a baffle 35 is mounted on the upper surface of the perforate plate 31 and held in position by a plurality of lugs 36 inwardly struck from the bead 16 on the casing part 11. This baffle is in the form of a hollow truncated cone and extends upwardly to a desirable extent in the part 12 of the casing. Very heavy dirt particles, therefore, will fall between the baffle and casing wall and remain there until the casing is taken apart and cleansed or until a sufficiently strong current is produced to carry them out the opening 28. It might be well noted that the cross-sectional area of the outlet conduit 23 is substantially equal to the cross-sectional area of the inlets 25 plus each of the inlet openings 27, so that there will be no unnecessary restriction to the free flow of air through the casing.

The operation of the present invention is sufficiently apparent from the foregoing so that only a brief summary is necessary herein. When suction is created in the outlet conduit 23 due to the functioning of an internal combustion engine or other mechanism, air is drawn into the cleaner through the inlet 25 and the annular series of inlets 27 and caused to whirl in the part 12 of the casing, this whirl being maintained chiefly adjacent the upper portion of the casing due to the fact that the inlets are in different transverse planes. Foreign particles separated from the air by the whirling action are discharged through the outlet 28, the strip 30 serving to create a backward suction which removes from the whirling air those particles of dust or dirt which are too light to assume a position next to the casing wall and so be discharged through the outlet without the aid of an additional suction. Heavier particles of dirt are prevented from contacting the filter means in the lower part 11 of the casing by means of the baffle 35, so that the filter means are kept as clean as possible and need only be cleansed at relatively long intervals. After the major portion of foreign substances carried by incoming air has been expelled through the discharge opening 28, the air then passes through the filter mass 32 and the finer particles of dirt and dust are removed therefrom. When it is desired to clean the filter mass, it is simply necessary to take the casing apart by loosening the thumb nut 20 and then wash the lower portion of the casing including the filter mass in an oil bath.

In Figures 7 and 8, we have shown a slightly different form of construction for the present invention. In this instance, a casing is used which is substantially identical with that shown in Figures 1 to 6 inclusive, the casing comprising two parts 11 and 12 formed for telescopic association, the same as previously described herein. The lower casing 11 is provided with an outlet conduit 23 and a yoke 19. The upper casing is provided with an inlet 25 for incoming air shielded by a tangential hood 26, an annular series of louver-like inlets 27 in the end wall 13 and an outlet opening 28 for the discharge of foreign particles separated from the air by the whirling motion, the outlet having a skimmer 29 thereadjacent. The two casing parts are secured together by means of a through bolt 17 and thumb nut 20. There is also the baffle 35 to prevent heavier dirt particles from contacting with the filter mass now about to be described.

The structure shown in Figures 7 and 8 differs from that shown in Figures 1 to 6 inclusive only in the filtering means. In this instance, a pair of spaced reticulated screens 37 and 38 are utilized, between which a mass of steel wool or some similar material 39 is compressed in any desired manner. The cleaner shown in Figures 7 and 8 functions identically in the same manner as hereinabove described in connection with Figures 1 to 6.

In Figures 9 and 10, we have shown a still different form of the present invention which differs from the forms previously described herein only in the construction of the discharge opening for foreign particles separated from the air by the whirling action. In this case, the casing 12 is provided with a series of apertures 40 instead of the slot-like opening 28. Adjacent these apertures a skimmer 41 is riveted to the inner casing wall as indicated at 42, this skimmer functioning the same as the skimmer 29 previously described. The spaced apertures 40 are indicative of another form of outlet for the discharge of dirt particles, although the slot 28 previously described is, in most cases, a preferred form.

From the foregoing, it will be apparent that I have provided an air cleaner capable of removing substantially all impurities carried by incoming air, so that any impurities which may possibly be left in the air are negligible. Moreover, the present invention is simple in construction and operation, requires very little attention, may be easily taken apart and assembled, and may be economically manufactured. In addition, it is easily installed and operates in any desired position.

We are aware that many changes may be made, and numerous details of construction may be varied through a wide range without departing from the principles of this invention, and we, therefore, do not purpose limiting the patent granted hereon, otherwise than is necessitated by the prior art.

We claim as our invention:

1. An air cleaner including a casing having an inlet arranged to impart a whirling motion to entering air, said casing having a peripheral outlet for the discharge of foreign particles separated from the air by said whirling motion, and means for creating a rearward suction adjacent said outlet on the far side thereof in the direction of whirl.

2. An air cleaner including a casing having an inlet arranged to impart a whirling motion to entering air, said casing having an opening therein for the discharge of foreign particles separated from the air by said whirling motion, and a member in said casing extending the length of said opening but spaced therefrom and arranged so that a backward suction will be created adjacent the far side of said member in the direction of whirl.

3. An air cleaner including a casing having entrance means therefor arranged to impart a whirling motion to entering air, said casing having a slot therein for the discharge of foreign particles removed from the air by said whirling motion, and a curved strip mounted in said casing to overlie said slot in spaced relationship thereto, said strip being disposed at an angle to said slot, whereby whirling air will pass on both sides of said strip and create a backward suction between said strip and the casing wall adjacent the far margin of said strip.

4. An air cleaner including a two-part casing having inlet means in one part thereof arranged to impart a whirling motion to entering air, said part having an outlet for the discharge of foreign particles separated from the air by said whirling motion, the other part of said casing having an outlet therein for cleaned air, a spindle securable to both parts of said casing for holding said parts together, and filter means wound on said spindle to substantially the same cross-sectional area as said casing and located in advance of said clean air outlet.

THOMAS G. MOULDING.
JOHN T. BEATTY.